J. Parker.
Slaughtering Elevator.
No. 12395  Patented Feb. 13, 1855.
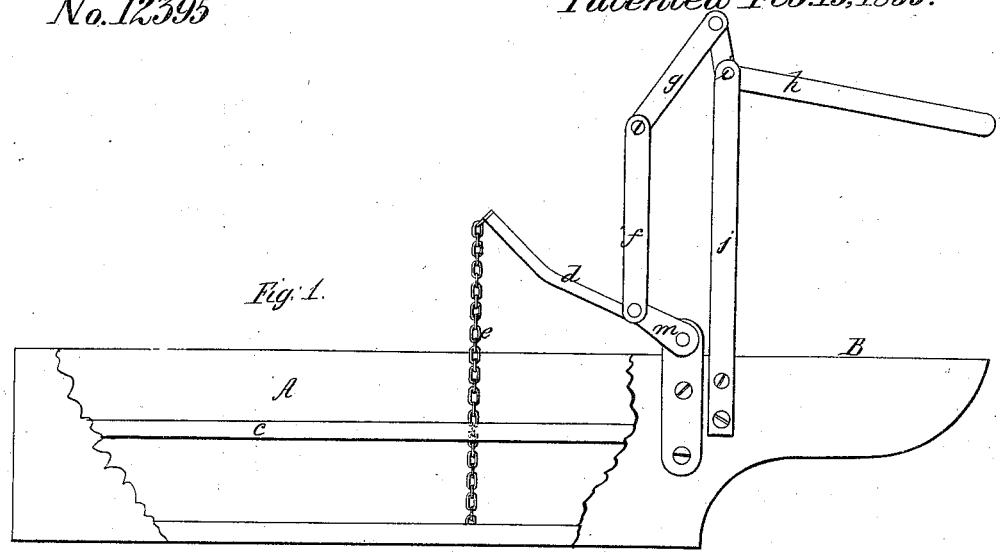
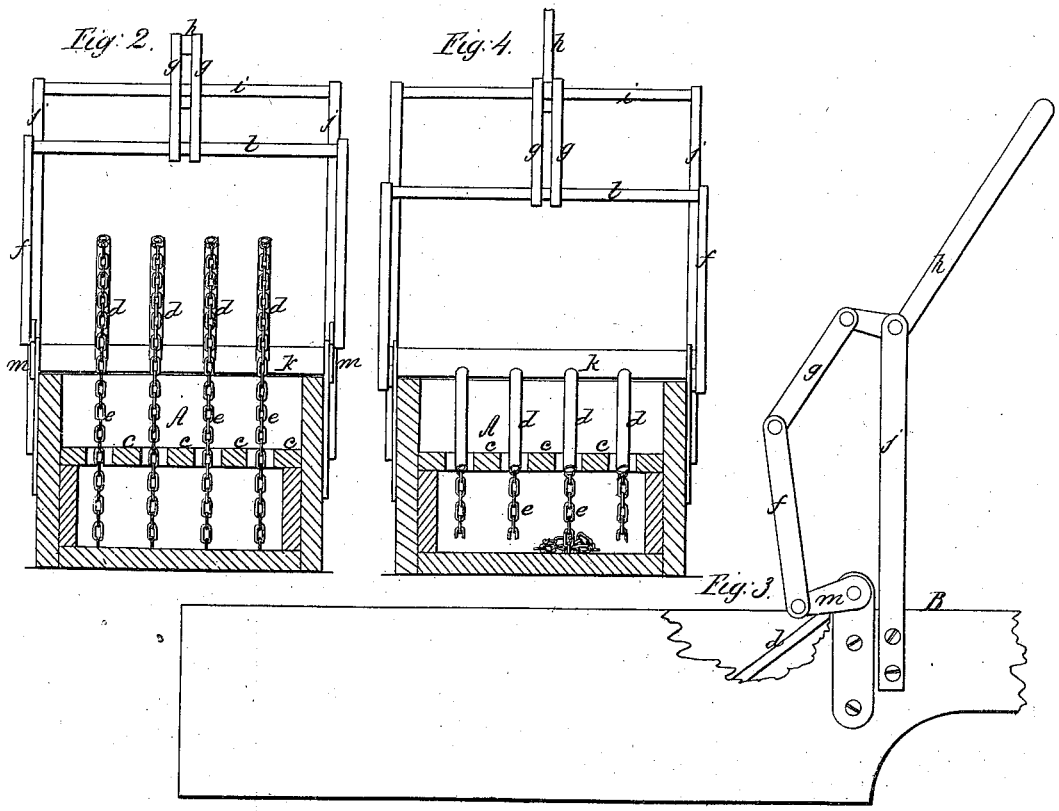

UNITED STATES PATENT OFFICE.

JEFFERSON PARKER, OF LOUISVILLE, KENTUCKY.

MACHINE FOR SLAUGHTERING HOGS.

Specification forming part of Letters Patent No. 12,395, dated February 13, 1855; Reissued November 3, 1868, No. 3,180.

*To all whom it may concern:*

Be it known that I, JEFFERSON PARKER, of Louisville, in the county of Jefferson and State of Kentucky, have invented a new and useful Improvement in the Vessels for Scalding Hogs; and I do hereby declare that the following is a full and exact description thereof, reference being had to the accompanying drawings, making a part of this specification.

A, is the oblong scalding vessel.

$c, c$, are longitudinal bars, secured within the said vessel for the hogs to rest upon whilst undergoing the scalding process.

B, is the scraping table at one end of the scalding vessel, to which the hogs are removed from the scalding vessel for the purpose of cleaning them. The hogs are removed from the scalding vessel to the scraping table in the following easy and convenient manner; viz: by means of the fingers $d, d$, which project from the horizontal shaft $k$, that is placed at the inner end of the scraping table B, and which has short arms $m$, at the extremity of each of its journals, that are connected, by means of the side levers $f, f$, the horizontal shaft $l$, and the central levers $g, g$, with the short end of the curved operating lever $h$, which works upon the fulcrum shaft $i$, that is secured in the uprights $j, j$, as shown in the drawings. The said fingers are so arranged that when they are let down into the position shown in Figs. 3 and 4, they will pass between the slats $c, c$, in the scalding vessel, and they (the said fingers) are curved into such a shape that when they are thus depressed and a hog is floated over them, the hog will be lifted upon said fingers as they are elevated, and as said fingers are carried upwards, into the position shown in Fig. 1, the hog elevated by them, will glide off upon the scraping table B.

The chains $c, c$, which are connected to the ends of the fingers $d, d$, and to the bottom of the scalding vessel, must be of such a length that they will be straightened when the fingers are elevated to their highest position: (as shown in Fig. 1;) the object of which arrangement is to keep the hogs in the scalding vessel from floating under the fingers when they are elevated and preventing their return to the proper position for elevating another hog to the scraping table.

What I claim as my invention and desire to secure by Letters Patent, is—

The arrangement of the elevating fingers $d, d$, and the chains $e, e$, with the operating levers and with the scalding vessel A, and the scraping bench B, substantially in the manner and for the purpose herein set forth.

The above specification of my improved method of lifting hogs from the scalding tub to the cleaning table, signed and witnessed this 30th day of October, 1854.

JEFFERSON PARKER.

Witnesses:
   E. BARBARON,
   A. L. WARD,

[FIRST PRINTED 1913.]